United States Patent
Peng et al.

(10) Patent No.: US 12,448,912 B2
(45) Date of Patent: Oct. 21, 2025

(54) SYSTEMS AND METHODS FOR MULTI-FACTOR DIAGNOSIS OF EXHAUST AFTERTREATMENT SYSTEM COMPONENTS

(71) Applicant: Cummins Inc., Columbus, IN (US)

(72) Inventors: Jiyin Peng, Beijing (CN); Ying Y. Yang, Beijing (CN); Xiao X. Wang, Beijing (CN); Ye Yuan, Beijing (CN)

(73) Assignee: Cummins Inc., Columbus, IN (US)

( * ) Notice: Subject to any disclaimer, the term of this patent is extended or adjusted under 35 U.S.C. 154(b) by 272 days.

(21) Appl. No.: 18/134,398

(22) Filed: Apr. 13, 2023

(65) Prior Publication Data

US 2023/0332531 A1  Oct. 19, 2023

(30) Foreign Application Priority Data

Apr. 15, 2022 (CN) .......................... 202210399826.4

(51) Int. Cl.
*F01N 11/00* (2006.01)
*F01N 3/021* (2006.01)
*F01N 9/00* (2006.01)

(52) U.S. Cl.
CPC ............ *F01N 11/002* (2013.01); *F01N 3/021* (2013.01); *F01N 9/002* (2013.01);
(Continued)

(58) Field of Classification Search
CPC .... F01N 11/002; F01N 2550/04; F01N 3/021; F01N 9/002; F01N 2560/08; F01N 2900/1406; F01N 2900/1606; F01N 11/00; F01N 2900/16; G01M 3/26; G01N 15/0826; G01N 2015/084; G01N 15/06; G01N 2015/0046; G07C 5/006; G07C 5/0808; G07C 5/0825
See application file for complete search history.

(56) References Cited

U.S. PATENT DOCUMENTS 4,625,545 A    12/1986 Holm et al.
9,151,206 B2 * 10/2015 Van Nieuwstadt ..... F01N 3/101
(Continued)

FOREIGN PATENT DOCUMENTS

CN  108061629 B  1/2020
CN  110594020 B  1/2021

*Primary Examiner* — Matthew T Largi
(74) *Attorney, Agent, or Firm* — Foley & Lardner LLP

(57) ABSTRACT

Systems and methods for diagnosing an aftertreatment system are provided. The system includes an aftertreatment system having a diesel particulate filter (DPF). The system includes a controller configured to: receive sensor data including pressure change data and flow rate data from a sensor; determine a flow resistance of the DPF and a pressure change value; determine that the flow resistance is less than a flow resistance threshold; determine whether the pressure change value is less than a pressure change value threshold; trigger a first failure warning based on determining that the flow resistance is less than the flow resistance threshold and that the pressure change value is less than the pressure change value threshold; and trigger a second failure warning based on determining that that the flow resistance is less than the flow resistance threshold and that the pressure change value is greater than the pressure change value threshold.

20 Claims, 7 Drawing Sheets

(52) U.S. Cl.
 CPC .. *F01N 2560/08* (2013.01); *F01N 2900/1406* (2013.01); *F01N 2900/16* (2013.01); *F01N 2900/1606* (2013.01)

(56) References Cited

U.S. PATENT DOCUMENTS

| | | | |
|---|---|---|---|
| 9,983,091 B2 | 5/2018 | Franklin et al. | |
| 10,125,652 B2* | 11/2018 | Kurisaka | F02B 37/007 |
| 10,822,112 B2 | 11/2020 | Brown | |
| 2005/0178272 A1* | 8/2005 | Kariya | B01D 46/46 96/421 |
| 2009/0145111 A1* | 6/2009 | Takahashi | F01N 3/0231 60/277 |
| 2010/0139254 A1* | 6/2010 | Sebestyen | F01N 11/00 60/303 |
| 2010/0186377 A1* | 7/2010 | Shibata | F02D 41/1441 60/275 |
| 2011/0100094 A1* | 5/2011 | Konrad | F01N 11/002 73/28.04 |
| 2012/0116645 A1* | 5/2012 | Hamahata | F01N 13/011 701/102 |
| 2014/0244062 A1* | 8/2014 | Baumann | B60R 16/03 700/297 |
| 2017/0254791 A1 | 9/2017 | Nink et al. | |
| 2018/0087431 A1* | 3/2018 | Karpe | F01N 3/2066 |

\* cited by examiner

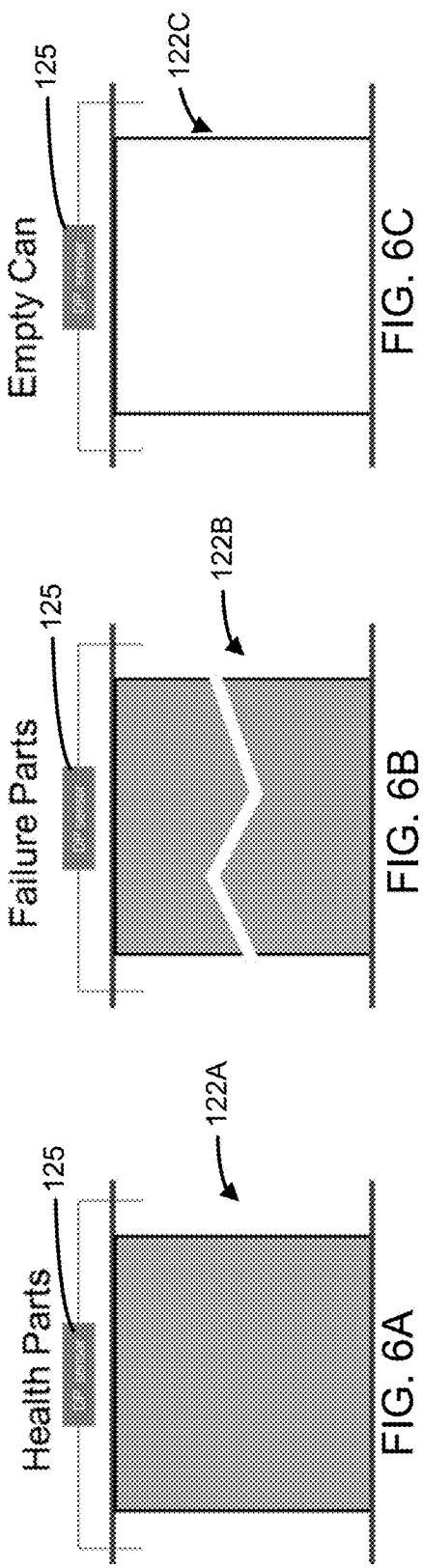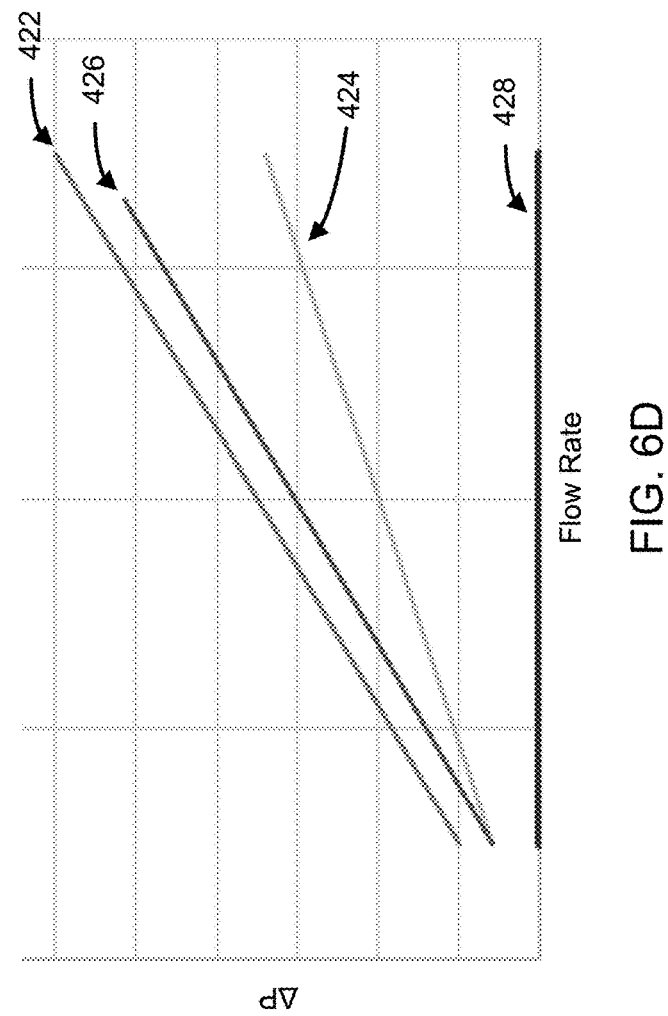

SYSTEMS AND METHODS FOR MULTI-FACTOR DIAGNOSIS OF EXHAUST AFTERTREATMENT SYSTEM COMPONENTS

CROSS-REFERENCE TO RELATED CASES

This application claims priority to Chinese Patent Application No. 2022103998264, filed on Apr. 15, 2022, entitled SYSTEMS AND METHODS FOR MULT-FACTOR DIAGNOSIS OF EXHAUST AFTERMATH SYSTEM COMPONENTS, which is incorporated herein by reference in its entirety.

TECHNICAL FIELD

The present disclosure relates to exhaust aftertreatment systems for vehicles. More particularly, the present disclosure relates to systems and methods for diagnosing component failure or potential component failure in aftertreatment systems using an onboard controller.

BACKGROUND

Many engines are coupled to exhaust aftertreatment systems that reduce harmful exhaust gas emissions (e.g., nitrous oxides (NOx), sulfur oxides, particulate matter, etc.). For example, a particulate filter may be positioned in the exhaust stream to remove particulate matter from the exhaust gas. Over time, the particulate filter may degrade in performance and require maintenance and/or replacement. Onboard sensors and diagnostic systems may be used to monitor the particulate filter's performance, and indicate when maintenance is needed.

SUMMARY

One embodiment relates to a system. The system includes an aftertreatment system in exhaust gas receiving communication with an engine. The aftertreatment system includes a diesel particulate filter (DPF). The system also includes at least one sensor coupled to the DPF. The system also includes a controller configured to perform operations to diagnose a DPF failure. The operations include receive sensor data from the at least one sensor. The sensor data includes a pressure change and a flow rate. The operations also include determine, based on the sensor data, a flow resistance of the DPF and a pressure change value. The operations also include determine that the flow resistance is less than a flow resistance threshold. The operations also include determine whether the pressure change value is less than a pressure change value threshold, responsive to determining that the flow resistance is less than the flow resistance threshold. The operations also include trigger a first failure warning based on determining that the flow resistance is less than the flow resistance threshold and that the pressure change value is less than the pressure change value threshold. The operations also include trigger a second failure warning based on determining that that the flow resistance is less than the flow resistance threshold and that the pressure change value is greater than the pressure change value threshold.

Another embodiment relates to a method of diagnosing an aftertreatment system component. The method includes receiving sensor data from at least one sensor. The sensor data includes a pressure change and a flow rate associated with a diesel particulate filter (DPF). The method also includes determining, based on the sensor data, a flow resistance of the DPF and a pressure change value. The method also includes determining that the flow resistance is less than a flow resistance threshold. The method also includes determining whether the pressure change value is less than a pressure change value threshold, responsive to determining that the flow resistance is less than the flow resistance threshold. The method also includes triggering a first failure warning based on determining that the flow resistance is less than the flow resistance threshold and that the pressure change value is less than the pressure change value threshold. The method also includes triggering a second failure warning based on determining that that the flow resistance is less than the flow resistance threshold and that the pressure change value is greater than the pressure change value threshold.

Another embodiment relates to an apparatus for diagnosing an aftertreatment system component (e.g., of a vehicle). The apparatus includes one or more processors and memory storing instructions that, when executed by the one or more processors, cause the one or more processors to perform operations. The operations include receiving sensor data from at least one sensor. The sensor data includes a pressure change and a flow rate associated with a diesel particulate filter (DPF). The operations further include determining, based on the sensor data, a flow resistance of the DPF and a pressure change value. The operations further include determining that the flow resistance is less than a flow resistance threshold. The operations further include determining whether the pressure change value is less than a pressure change value threshold responsive to determining that the flow resistance is less than the flow resistance threshold. The operations further include triggering a first failure warning based on determining that the flow resistance is less than the flow resistance threshold and that the pressure change value is less than the pressure change value threshold. The operations further include triggering a second failure warning based on determining that the flow resistance is less than the flow resistance threshold and that the pressure change value is greater than the pressure change slope threshold.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

FIG. 6A is an illustration of a component of the aftertreatment system of the vehicle of FIG. 1, showing a healthy component, according to an example embodiment.

FIG. 6B is an illustration of a component of the aftertreatment system of the vehicle of FIG. 1, showing a failed component, according to an example embodiment.

FIG. 6C is an illustration of a component of the aftertreatment system of the vehicle of FIG. 1, showing an empty component, according to an example embodiment.

FIG. 6D is a graph illustrating aspects of monitoring an aftertreatment system of the vehicle of FIG. 1, according to an example embodiment.

DETAILED DESCRIPTION

Figure 1:
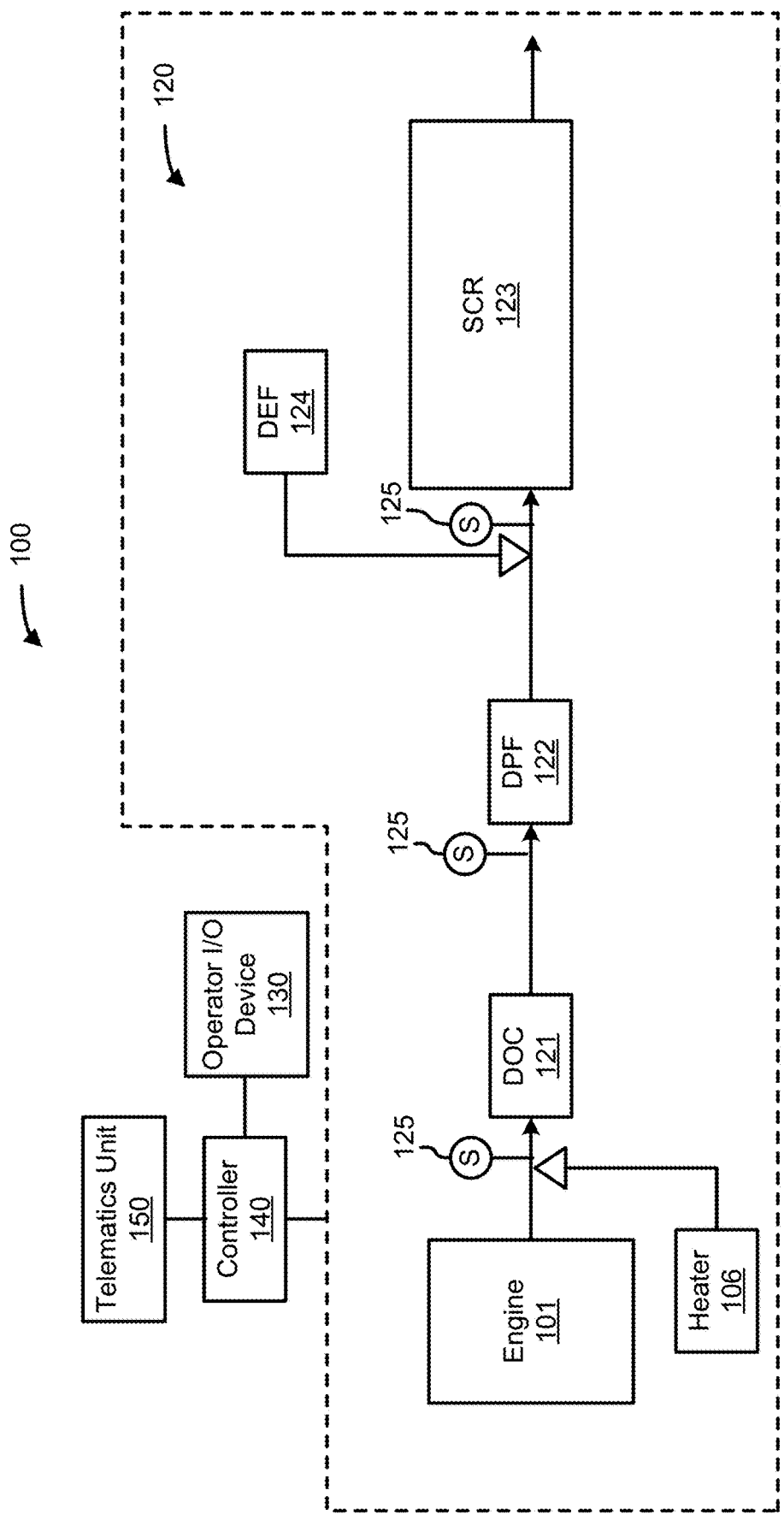
FIG. 1 is a schematic view of a block diagram of a vehicle system, according to an example embodiment.

Following below are more detailed descriptions of various concepts related to, and implementations of, methods, apparatuses, and systems for monitoring, diagnosing, and reporting component failures in an exhaust aftertreatment system of a vehicle. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As described herein, an exhaust gas aftertreatment system may include a particulate filter configured to remove particulate matter, such as soot, from exhaust gas flowing in the exhaust gas conduit system. A control system or controller may monitor one or more parameters of the particulate filter using one or more sensors (e.g., actual sensors and/or virtual sensors) to collect and/or determine sensor data. The control system may analyze the sensor data and compare the analyzed sensor data with one or more thresholds. The control system may determine that the particulate filter has failed based on the analyzed sensor data exceeding the one or more thresholds (or otherwise not falling with a desired/acceptable range). More specifically, the control system may determine a type of failure based on the analyzed sensor data exceeding a particular threshold.

Technically and beneficially, the systems, methods, and apparatuses described herein provide an improved control system that uses sensor data to determine if a component of an aftertreatment system has failed and a type of failure. The control systems described herein advantageously utilize a particular control strategy to improve diagnostic accuracy thereby reducing the amount of false positive failure reports (i.e., falsely reporting that a component has failed, when the component has not failed or reporting an incorrect failure type). That is, the systems and methods described herein provide a technical solution to the technical problem of accurately diagnosing aftertreatment system components by using a particular computer-based process. The computer-based process improves the accuracy of diagnosing aftertreatment system components by analyzing sensor data (e.g., actual sensor data and/or virtual sensor data) to determine if one or more parameters of the aftertreatment system component exceeds a respective threshold.

In an example operating scenario, a control system (e.g., a controller, an engine control module, vehicle controller, etc.) utilizes one or more sensors (e.g., real sensors and/or virtual sensors) to detect one or more parameters of an exhaust aftertreatment system component, such as a particulate filter. The control system may analyze sensor data collected and/or generated by the one or more sensors. Analyzing the sensor data may include using one or more statistical models, such as a regression model, a machine learning model, etc., to determine one or more parameters of the particulate filter. The control system may compare the one or more parameters with a respective threshold, and determine, based on the comparison (such as a parameter exceeding a respective threshold), a type of failure.

Referring now to FIG. 1 a schematic view of a block diagram of a system 100 is shown, according to an example embodiment. The system 100 includes an engine 101, an aftertreatment system 120 coupled to the engine 101, an operator I/O device 130, a controller 140, and a telematics unit 150, where the controller 140 is communicably coupled to each of the aforementioned components. The telematics unit 150 facilitates the acquisition and transmission of data acquired regarding the operation of the system 100 over a network. In the configuration of FIG. 1, the system 100 is included in a vehicle. The vehicle may be any type of on-road or off-road vehicle including, but not limited to, wheel-loaders, fork-lift trucks, line-haul trucks, mid-range trucks (e.g., pick-up truck, etc.), sedans, coupes, tanks, airplanes, boats, and any other type of vehicle. In another embodiment, the system 100 may be embodied in a stationary piece of equipment, such as a power generator or genset. All such variations are intended to fall within the scope of the present disclosure.

The engine 101 may be any type of engine that generates exhaust gas, such as a gasoline, natural gas, or diesel engine, a hybrid engine (e.g., a combination of an internal combustion engine and an electric motor), and/or any other suitable engine. In the example depicted, the engine 101 is a diesel-powered compression-ignition engine. In various alternate embodiments, the engine 101 may be structured as another type of engine (e.g., spark-ignition) that utilizes another type of fuel (e.g., gasoline, natural gas, biodiesel). In still other example embodiments, the engine 101 may be a part of a hybrid vehicle and be coupled to an electric motor. In regards to a hybrid vehicle, conventional hybrid engine systems generally include both an electric motor or motors and an internal combustion engine that function to provide power to the drivetrain in order to propel the vehicle. A hybrid vehicle can have various configurations. For example, in a parallel configuration, both the electric motor and the internal combustion engine are operably connected to the drivetrain/transmission to propel the vehicle. In a series configuration, the electric motor is operably connected to the drivetrain/transmission and the internal combustion engine indirectly powers the drivetrain/transmission by powering the electric motor (e.g., extended range electric vehicles or range-extended electric vehicles). In a series-parallel configuration, the hybrid vehicle has features from both the parallel configuration and the series configuration. For example, the internal combustion engine may be operably connected to the drivetrain/transmission to propel the vehicle and power the electric motor.

The engine 101 may include one or more cylinders and associated pistons. Air from the atmosphere is combined with fuel, and combusted, to generate power from the engine 101. Combustion of the fuel and air in the compression chambers of the engine 101 produces exhaust gas that is operatively vented to an exhaust pipe and to the aftertreatment system 120. The engine 101 may be coupled to a turbocharger (not shown). The turbocharger (e.g., variable geometry turbocharger or another turbocharger) includes a compressor coupled to an exhaust gas turbine via a connector shaft. Generally, hot exhaust gasses spin the turbine which rotates the shaft and in turn, the compressor, which draws air in. By compressing the air, more air can enter the cylinders, or combustion chamber, thus burning more fuel and increasing power and efficiency. A heat exchanger, such as a charge air cooler, may be used to cool the compressed air before the air enters the cylinders. In some embodiments, the turbocharger is omitted.

The aftertreatment system 120 is shown, according to an example embodiment. It should be understood that the schematic depicted in FIG. 1 is but one implementation of an exhaust gas aftertreatment system architecture. Many different configurations may be implemented that utilize the systems and methods described herein.

The aftertreatment system 120 is in exhaust-gas receiving communication with the engine 101. The aftertreatment system includes a diesel particulate filter (DPF) 122, a diesel oxidation catalyst (DOC) 121, a selective catalytic reduction (SCR) system 123, and an ammonia slip catalyst (ASC) (not shown). The DOC 121 is structured to receive the exhaust gas from the engine 110 and to oxidize hydrocarbons and carbon monoxide in the exhaust gas. The DPF 122 is arranged or positioned downstream of the DOC 121 and is structured to remove particulates, such as soot, from exhaust gas flowing in the exhaust gas stream. The DPF 122 includes an inlet, where the exhaust gas is received, and an outlet, where the exhaust gas exits after having particulate matter substantially filtered from the exhaust gas and/or converting the particulate matter into carbon dioxide. In some arrangements the DPF 122 includes a removable filter portion positioned within a canister. The removable filter portion may degrade over time and may be repaired and/or replaced.

In some implementations, one or more of the components of the aftertreatment system 120 may be omitted. Additionally, although a particular arrangement is shown for the aftertreatment system 120 in FIG. 1, the arrangement of components within the aftertreatment system 120 may be different in other embodiments (e.g., the DPF 122 positioned downstream of the SCR 123 and ASC, one or more components omitted or added (e.g., an electric heater for providing heat to the aftertreatment system), etc.).

The aftertreatment system 120 may further include a reductant delivery system 124 which may include a decomposition chamber (e.g., decomposition reactor, reactor pipe, decomposition tube, reactor tube, etc.) to convert a reductant into ammonia. The reductant may be, for example, urea, diesel exhaust fluid (DEF), Adblue®, a urea water solution (UWS), an aqueous urea solution (e.g., AUS32, etc.), and other similar fluids. A diesel exhaust fluid (DEF) is added to the exhaust gas stream to aid in the catalytic reduction. The reductant may be injected upstream of the SCR 123 generally (or in particular, the SCR catalyst) by a DEF doser such that the SCR catalyst receives a mixture of the reductant and exhaust gas. The reductant droplets then undergo the processes of evaporation, thermolysis, and hydrolysis to form gaseous ammonia within the decomposition chamber, the SCR catalyst, and/or the exhaust gas conduit system, which leaves the aftertreatment system 120. The aftertreatment system 120 may further include an oxidation catalyst (e.g., the DOC 121) fluidly coupled to the exhaust gas conduit system to oxidize hydrocarbons and carbon monoxide in the exhaust gas. In order to properly assist in this reduction, the DOC 121 may be required to be at a certain operating temperature. In some embodiments, this certain operating temperature is approximately between 200-500° C. In other embodiments, the certain operating temperature is the temperature at which the conversion efficiency of the DOC 121 exceeds a predefined threshold (e.g. the conversion of HC to less harmful compounds, which is known as the HC conversion efficiency).

The SCR 123 is configured to assist in the reduction of NOx emissions by accelerating a NOx reduction process between the ammonia and the NOx of the exhaust gas into diatomic nitrogen and water. If the SCR catalyst is not at or above a certain temperature, the acceleration of the NOx reduction process is limited and the SCR 123 may not be operating at a level of efficiency to meet regulations. In some embodiments, this certain temperature is approximately 200-600° C. The SCR catalyst may be made from a combination of an inactive material and an active catalyst, such that the inactive material (e.g. ceramic substrate) directs the exhaust gas towards the active catalyst, which is any sort of material suitable for catalytic reduction (e.g. metal exchanged zeolite (Fe or Cu/zeolite), base metals oxides like vanadium, molybdenum, tungsten, etc.).

When ammonia in the exhaust gas does not react with the SCR catalyst (either because the SCR 123 is below operating temperature or because the amount of dosed ammonia greatly exceeds the amount of NOx), the unreacted ammonia may bind to the SCR catalyst, becoming stored in the SCR 123. This stored ammonia is released from the SCR 123 as the SCR 123 warms, which can cause issues if the amount of ammonia released is greater than the amount of NOx passing through (i.e., more ammonia than needed for the amount of NOx, which can lead to ammonia slip). In some embodiments, the ASC is included and structured to address ammonia slip by removing at least some excess ammonia from the treated exhaust gas before the treated exhaust is released into the atmosphere. As exhaust gas passes through the ASC, some of unreacted ammonia (i.e., unreacted with NOx) remaining in the exhaust gas is partially oxidized to NOx, which then consequently reacts with the remaining unreacted ammonia to form $N_2$ gas and water. However, similar to the SCR catalyst, if the ASC is not at or above a certain temperature, the acceleration of the $NH_3$ oxidization process is limited and the ASC may not be operating at a level of efficiency to meet regulations or desired parameters. In some embodiments, this certain temperature is approximately 250-300° C.

As shown, a plurality of sensors 125 are included in the aftertreatment system 120. The number, placement, and type of sensors included in the aftertreatment system 120 is shown for example purposes only. That is, in other configurations, the number, placement, and type of sensors may differ. The sensors 125 may be NOx sensors, temperature sensors, particulate matter (PM) sensors, flow rate sensors, other emissions constituents sensors, pressure sensors, some combination thereof, and so on. The PM sensors are structured to acquire data indicative of a PM value (e.g., amount, concentration, etc.) at each location that the PM sensor is located (e.g., a concentration amount, such as parts per million). The temperature sensors are structured to acquire data indicative of a temperature at their locations. The PM sensors are structured to monitor particulate matter (e.g., amount, concentration, etc.) flowing through the aftertreatment system 120.

The sensors 125 may be located after the engine 101 and before the aftertreatment system 120, after the aftertreatment system 120, in the aftertreatment system as shown (e.g., coupled to the DPF and/or DOC, coupled to the SCR, etc.), upstream and/or with the engine 101, etc. It should be understood that the location of the sensors may vary. In one embodiment, there may be sensors 125 located both before and after the aftertreatment system 120. In one embodiment, at least one of the sensors is structured as exhaust gas constituent sensors (e.g., CO, NOx, PM, SOx, etc. sensors). In another embodiment, at least one of the sensors 125 is structured as non-exhaust gas constituent sensors that are used to estimate exhaust gas emissions (e.g., temperature, flow rate, pressure, etc.). Additional sensors may be also included with the system 100. The sensors may include engine-related sensors (e.g., torque sensors, speed sensors, pressure sensors, flow rate sensors, temperature sensors, etc.). The sensors may further sensors associated with other components of the vehicle (e.g., speed sensor of a turbo charger, fuel quantity and injection rate sensor, fuel rail pressure sensor, etc.).

The sensors may be real or virtual (i.e., a non-physical sensor that is structured as program logic in the controller 140 that makes various estimations or determinations). For example, an engine speed sensor may be a real or virtual sensor arranged to measure or otherwise acquire data, values, or information indicative of a speed of the engine 101 (typically expressed in revolutions-per-minute). The sensor is coupled to the engine (when structured as a real sensor), and is structured to send a signal to the controller 140 indicative of the speed of the engine 101. When structured as a virtual sensor, at least one input may be used by the controller 140 in an algorithm, model, lookup table, etc. to determine or estimate a parameter of the engine (e.g., power output, etc.). Any of the sensors 125 described herein may be real or virtual.

The controller 140 is communicably coupled to the sensors 125. Accordingly, the controller 140 is structured to receive data from one more of the sensors 125. The received data may be used by the controller 140 to control one more components in the system 100 and/or for monitoring and diagnostic purposes.

Referring still to FIG. 1, an operator input/output (I/O) device 130 is also shown. The operator I/O device 130 may be coupled to the controller 140, such that information may be exchanged between the controller 140 and the I/O device 130, wherein the information may relate to one or more components of FIG. 1 or determinations (described below) of the controller 140. The operator I/O device 130 enables an operator of the system 100 to communicate with the controller 140 and one or more components of the system 100 of FIG. 1. For example, the operator input/output device 130 may include, but is not limited to, an interactive display, a touchscreen device, one or more buttons and switches, voice command receivers, etc. In this way, the operator input/output device 130 may provide one or more indications or notifications to an operator, such as a malfunction indicator lamp (MIL), etc. Additionally, the vehicle may include a port that enables the controller 140 to connect or couple to a scan tool so that fault codes and other information regarding the vehicle may be obtained.

The controller 140 is structured to control, at least partly, the operation of the system 100 and associated sub-systems, such as the engine 101 and the operator input/output (I/O) device 130. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 2.

As the components of FIG. 1 are shown to be embodied in the system 100, the controller 140 may be structured as one or more electronic control units (ECU), such as a microcontroller. The controller 140 may be separate from or included with at least one of a transmission control unit, an exhaust aftertreatment control unit, a powertrain control module, an engine control module, etc. The function and structure of the controller 140 is described in greater detail in FIG. 2.

Figure 2:
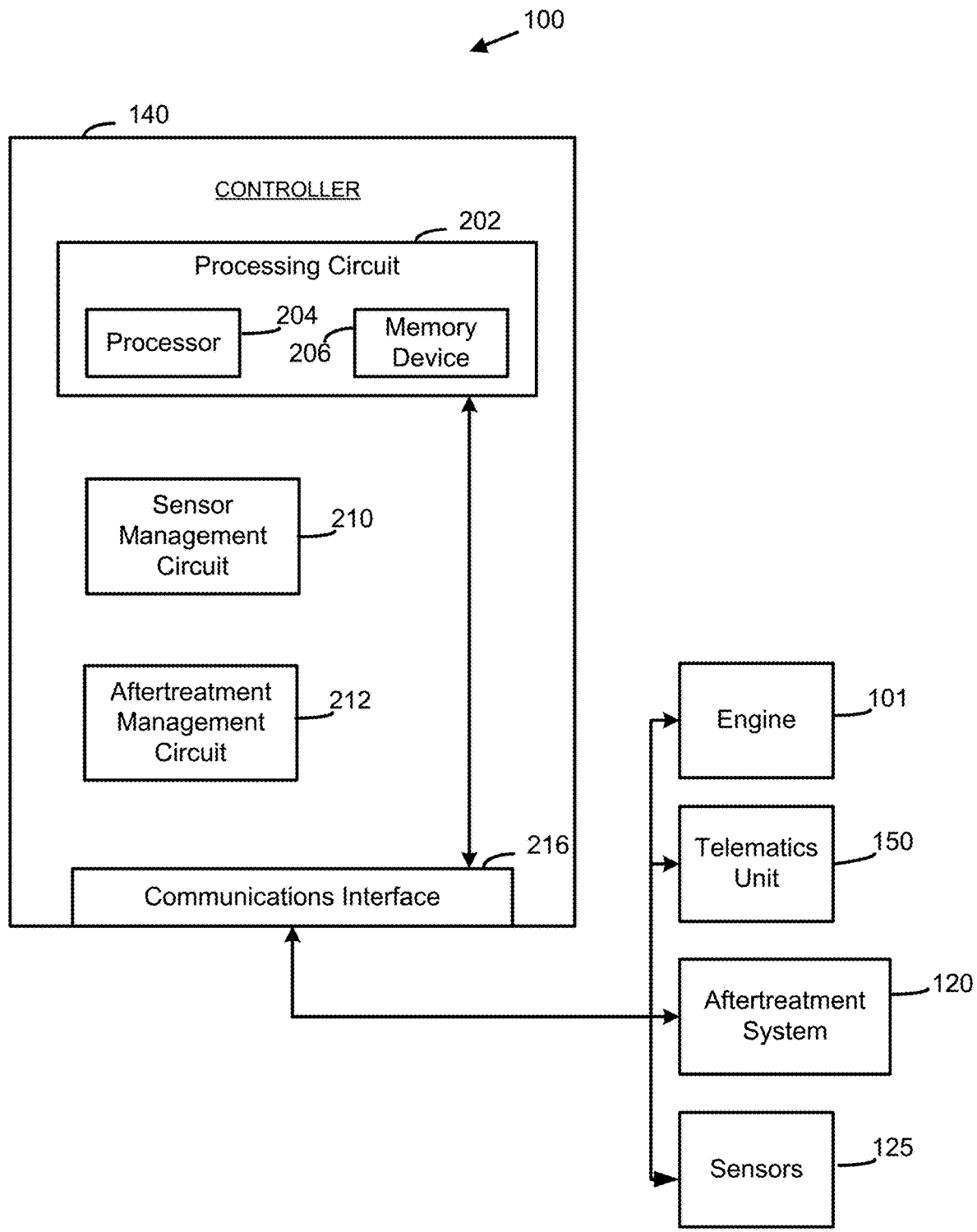
FIG. 2 is a block diagram of the controller of FIG. 1, according to an example embodiment.

Referring now to FIG. 2, a schematic diagram of the controller 140 of the system 100 of FIG. 1 is shown according to an example embodiment. As shown in FIG. 2, the controller 140 includes a processing circuit 202 having a processor 204 and a memory device 206, one or more specialized processing circuits, shown as a sensor management circuit 210 and an aftertreatment management circuit 212, and a communications interface 216. Generally, the controller 140 is structured to monitor, diagnose, and report component failures in the aftertreatment system 120 of the system 100.

In one configuration, the sensor management circuit 210 and/or the aftertreatment management circuit 212 are embodied as machine or computer-readable media storing instructions that are executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the sensor management circuit 210 and/or the aftertreatment management circuit 212 are embodied as hardware units, such as electronic control units. As such, the sensor management circuit 210 and/or the aftertreatment management circuit 212 may be embodied as one or more circuitry components including, but not limited to, processing circuitry, network interfaces, peripheral devices, input devices, output devices, sensors, etc. In some embodiments, the sensor management circuit 210 and/or the aftertreatment management circuit 212 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the sensor management circuit 210 and/or the aftertreatment management circuit 212 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The sensor management circuit 210 and/or the aftertreatment management circuit 212 may also include programmable hardware devices such as field programmable gate arrays, programmable array logic, programmable logic devices or the like. The sensor management circuit 210 and/or the aftertreatment management circuit 212 may include one or more memory devices for storing instructions that are executable by the processor(s) of the sensor management circuit 210 and/or the aftertreatment management circuit 212. The one or more memory devices and processor(s) may have the same definition as provided below with respect to the memory device 206 and processor 204. In some hardware unit configurations, the sensor management circuit 210 and/or the aftertreatment management circuit 212 may be geographically dispersed throughout separate locations in the vehicle. Alternatively and as shown, the sensor management circuit 210 and/or the aftertreatment management circuit 212 may be embodied in or within a single unit/housing, which is shown as the controller 140.

In the example shown, the controller 140 includes the processing circuit 202 having the processor 204 and the memory device 206. The processing circuit 202 may be structured or configured to execute or implement the instructions, commands, and/or control processes described herein with respect to the sensor management circuit 210 and/or the aftertreatment management circuit 212. The depicted configuration represents the sensor management circuit 210 and/or the aftertreatment management circuit 212 as machine or computer-readable media storing instructions. However, as mentioned above, this illustration is not meant to be limiting as the present disclosure contemplates other embodiments where the sensor management circuit 210 and/or the aftertreatment management circuit 212, or at least one circuit of the sensor management circuit 210 and/or the aftertreatment management circuit 212, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 204) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the sensor management circuit 210 and/or the aftertreatment management circuit 212 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 206 may be communicably connected to the processor 204 to provide computer code or instructions to the processor 204 for executing at least some of the processes described herein. Moreover, the memory device 206 may be or include tangible, non-transient volatile memory or non-volatile memory. Accordingly, the memory device 206 may include database components, object code components, script components, or any other type of information structure for supporting the various activities and information structures described herein.

The communications interface 216 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 216 may include an Ethernet card and port for sending and receiving data via an Ethernet-based communications network and/or a Wi-Fi transceiver for communicating via a wireless communications network. The communications interface 216 may be structured to communicate via local area networks or wide area networks (e.g., the Internet) and may use a variety of communications protocols (e.g., IP, LON, Bluetooth, ZigBee, radio, cellular, near field communication, etc.). Alternatively, out-of-vehicle communications may be accomplished via the telematics unit 150.

The communications interface 216 may facilitate communication between and among the controller 140 and one or more components of the system 100. For example and as shown in FIG. 2, the communications interface 216 may facilitate communication between and among the controller 140 and the engine 101, the aftertreatment system 120, the sensors 125, and the telematics unit 150. Communication between and among the controller 140 and the components of the system 100 may be via any number of wired or wireless connections (e.g., any standard under IEEE). For example, a wired connection may include a serial cable, a fiber optic cable, a CAT5 cable, or any other form of wired connection. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The sensor management circuit 210 is structured to control the operation of the sensors 125. For example, the sensor management circuit 210 may be structured to generate one or more control signals and transmit the control signals to one or more sensors 125 (e.g., to acquire data, etc.). The control signals may cause the one or more sensors 125 to sense and/or detect the sensor data and/or provide the sensor data to the sensor management circuit 210. In some embodiments, the sensor management circuit 210 may be structured to predict and/or estimate the sensor data (e.g., when the sensors 125 are virtual sensors). In any of these embodiments the sensor data may include temperature data, flow rate data, pressure data, and/or other data related to the operation of the aftertreatment system 120. The sensor management circuit 210 is also structured to receive the sensor data and provide the sensor data to the other components of the controller 140, such as the aftertreatment management circuit 212.

The aftertreatment management circuit 212 is structured to monitor, diagnose, and report component failures in the exhaust aftertreatment system 120 of the system 100 based on sensor data received from the sensors 125 (e.g., via the sensor management circuit 210). Specifically, the aftertreatment management circuit 212 is structured to diagnose component failures in the exhaust aftertreatment system 120 using a multi-factor diagnosis. For example, the aftertreatment management circuit 212 may analyze the sensor data to determine one or more parameters of the exhaust aftertreatment system 120 and/or a component thereof (e.g., the DPF 122). In some embodiments, the aftertreatment management circuit 212 may use one or more statistical models, such as a regression model, to determine one or more of the parameters. In some embodiments, the aftertreatment management circuit 212 may determine one or more fluid parameters of a fluid (e.g., exhaust gas) flowing through the exhaust aftertreatment system 120 and/or a component thereof. Accordingly, the aftertreatment management circuit 212 may determine one or more fluid parameters for/regarding the DPF 122 including, but not limited to a flow rate (e.g., a volumetric flow rate, a mass flow rate, etc.), a pressure change across the DPF 122, and/or a flow resistance (e.g., a ratio of pressure change to volumetric flow rate), by using the sensors 125 to measure and/or estimate these values. In some embodiments, the volumetric flow rate may be an actual volumetric flow rate measured in cubic meters per second (i.e., ACMS) or cubic feet per second (i.e., ft$^3$/s) (referred to herein as "Q" or "V"). In some embodiments the pressure change (referred to herein as "delta P" or "$\Delta$P" may be measured in kilopascals (i.e. kPa).

The aftertreatment management circuit 212 may receive sensor data from the sensors 125 including data indicative of the volumetric flow rate and/or the pressure change across a component of the aftertreatment system 120, such as the DPF 122. In an example embodiment, the $\Delta$P is a pressure differential between an inlet of the DPF 122 and an outlet of the DPF 122. In another example embodiment, the Q is the fluid flow rate through the DPF 122, determined by a virtual sensor. The aftertreatment management circuit 212 may determine, based on the sensor data a flow resistance across the component of the aftertreatment system 120. The aftertreatment management circuit 212 may analyze the sensor data by using one or more statistical models, such as a regression model, to compare the $\Delta$P and the Q. More specifically, the aftertreatment management circuit 212 may use a regression model to compare the $\Delta$P and the Q on a graph of $\Delta$P vs. Q and determine, a regression equation. In an example embodiment, the regression equation is a linear equation taking the form of y=m·x+b. In other embodiments, the regression equation may be non-linear. The aftertreatment management circuit 212 may use the regression equation to determine a slope of a curve defined by the regression equation (referred to herein as "$\Delta$P value" or "$\Delta$P slope"). Accordingly, the fluid parameters may include parameters determined based on sensor data (e.g., measured by actual sensors or estimated by virtual sensors) including the $\Delta$P and the Q, determined values such as the flow resistance and the $\Delta$P slope.

The aftertreatment management circuit 212 may compare one or more of the fluid parameters with a respective threshold to diagnose a component failure of the aftertreatment system 120. The aftertreatment management circuit 212 may determine that a component of the aftertreatment system 120 has failed based on determining that a fluid parameter exceeding a respective threshold. In an example embodiment, the aftertreatment management circuit 212 may compare a flow resistance to a flow resistance threshold to determine a first type of failure. Additionally and/or alternatively, the aftertreatment management circuit 212 may compare the $\Delta$P slope with a $\Delta$P slope threshold to determine a second type of failure. By utilizing this multi-factor analysis and approach, a reduction in false positives may be realized and an increased likelihood in accurate diagnosis of aftertreatment system components achieved. In some embodiments, the fluid parameters are compared against thresholds within a given interval. The logic used to diagnose component failures is described in more detail herein with respect to FIGS. 3 and 7.

Figure 3:
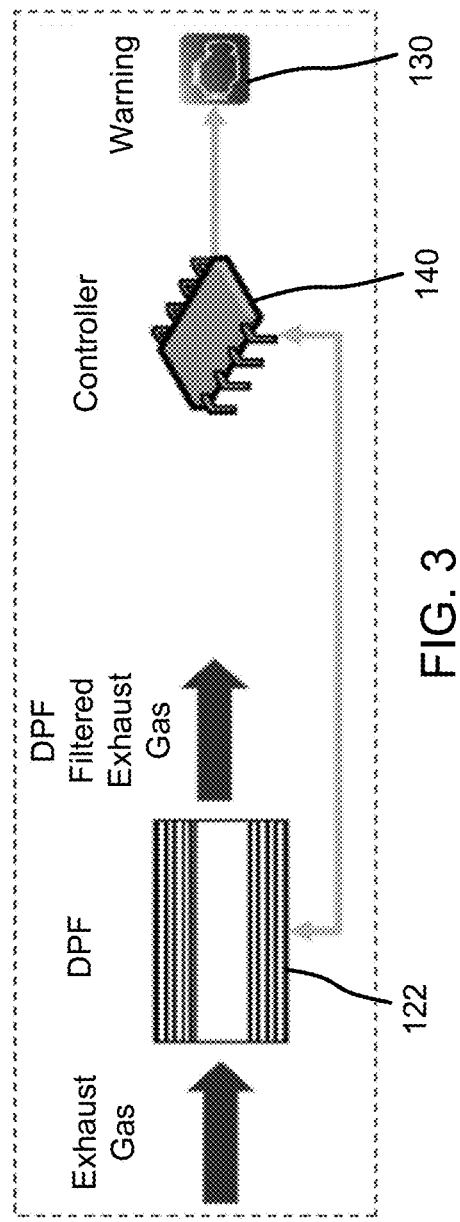
FIG. 3 is a flow diagram of a method of monitoring an aftertreatment system of the vehicle of FIG. 1, according to an example embodiment.

FIG. 3 is a flow diagram of a method of monitoring the aftertreatment system 120 of the system 100 of FIG. 1, according to an example embodiment. In the embodiment shown, the controller 140 is structured to monitor and diagnose the DPF 122. The controller 140 is also structured to generate an indication that the DPF 122 has failed, including a type of failure. As shown, exhaust gas enters the DPF 122 at an inlet side and the exhaust gas filtered by the DPF 122 exits the DPF 122 at an exhaust side. The controller 140 may receive, from the one or more sensors, sensor data including one or more fluid parameters of the exhaust gas flowing through the DPF. The controller 140 may analyze the sensor data to determine additional fluid parameters, as described above with respect to FIG. 2. The controller 140 may use multi-factor diagnostics to determine a type of failure based on the fluid parameters, as described in more detail herein with respect to FIG. 7. The controller 140 may generate an indication that the DPF 122 has failed. In some embodiments, the indication may include a type of failure. The failure types and described in more detail herein with respect to FIGS. 6A-6D. The controller 140 may provide the indication on the operator I/O device 130.

Figure 4A:
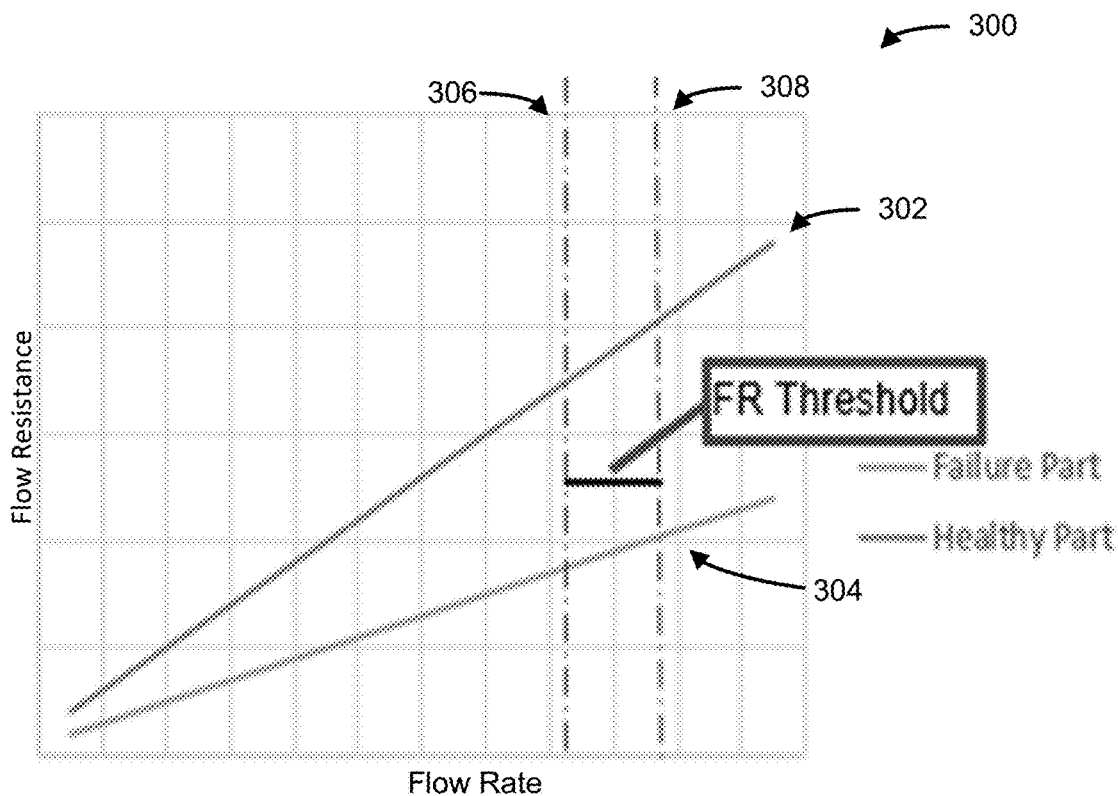
FIGS. 4A and 4B are graphs illustrating aspects of monitoring an aftertreatment system of the vehicle of FIG. 1, according to an example embodiment.
Figure 4B:
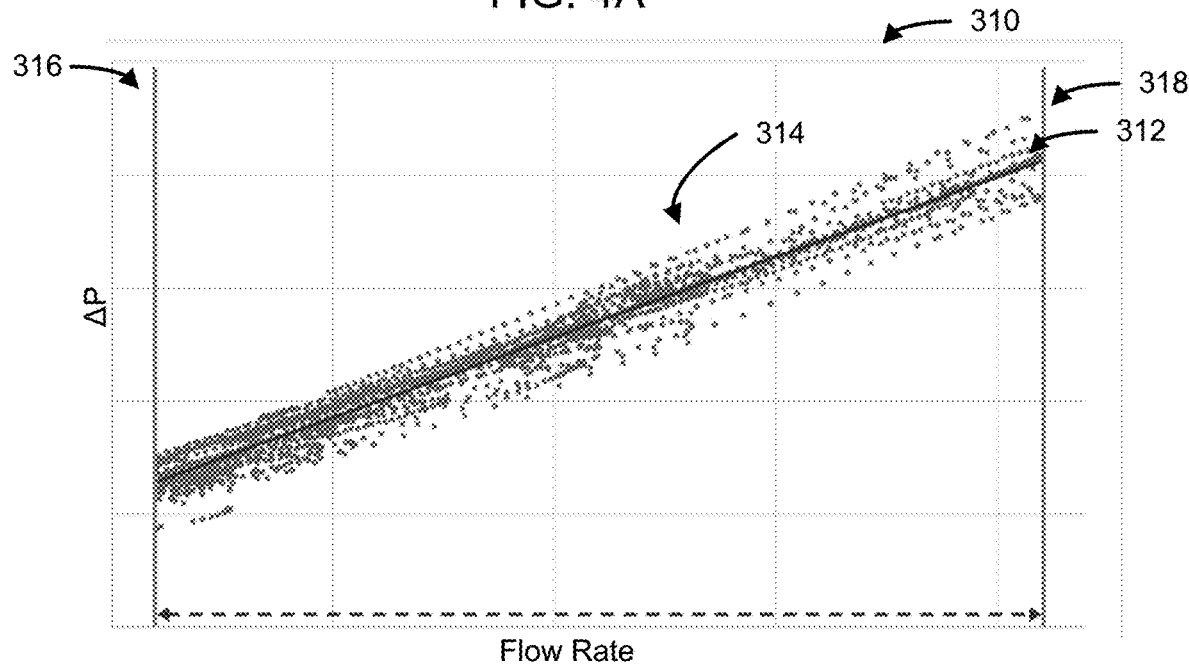

FIGS. 4A and 4B are a graphs illustrating aspects of monitoring the aftertreatment system 120 of the system 100 of FIG. 1, according to an example embodiment. Referring first to FIG. 4A, the graph 300 compares flow resistance versus flow rate. As briefly described above, the controller 140 may compare one or more fluid parameters with a respective threshold and within an interval of a different fluid parameter. As shown in FIG. 4A, the flow resistance may be compared against a flow resistance threshold for an interval of flow rates. For example and as shown in FIG. 4A, a first curve 302 represents the flow resistance versus flow rate for a DPF 122 that has not failed (e.g., a healthy DPF 122). The first curve 302 is substantially above a flow resistance threshold (labeled as "FR Threshold" in FIG. 4A) within a given flow rate interval. The flow rate interval is defined by a minimum flow rate 306 and a maximum flow rate 308. A second curve 304 represents the flow resistance versus flow rate for a DPF 122 that has failed due to a first failure type. The second curve 304 is substantially below the flow resistance threshold (FR Threshold) within the flow rate interval, between the minimum flow rate 306 and the maximum flow rate 308.

Now referring to FIG. 4B, a graph 310 compares ΔP versus flow rate. A first curve 312 represents a statistical model generated by analyzing the fluid parameters (e.g., by inputting data points 314 into a linear regression model) of a DPF 122. As shown in FIG. 4B, the ΔP may be compared against a flow resistance threshold for an interval of flow rates, between a minimum flow rate 316 and a maximum flow rate 318. In some embodiments, the controller 140 may only analyze data points within the flow rate interval (e.g., between a minimum flow rate 316 and a maximum flow rate 318). A slope of the first curve 312 may be determined based on the regression model. The slope of the first curve 312 may be referred to herein as "ΔP slope". The ΔP slope may be used to determine whether the DPF 122 has failed due to a second failure type, described herein with respect to FIGS. 5B and 7.

The first failure type may correspond with/be indicative of a damaged or broken DPF 122. Specifically, the first failure type may indicate a tear or hole in the DPF 122 that allows contaminants, such as particulate matter to flow through the DPF 122. As shown in FIG. 4B, the failed DPF 122 has lower ΔP than a healthy DPF 122, and the ΔP slope of the failed DPF 122 is different from the health ΔP slope. The second failure type may correspond with/be indicative of a leaking DPF 122. The leaking DPF 122 may include a misaligned filter of DPF 122 and/or damage to the DPF 122 that causes exhaust gas to leak out of the DPF 122. As shown in FIG. 4B, the leaking DPF 122 may have a reduced pressure change compared to a healthy DPF 122. However, the ΔP slope of the leaking DPF 122 is still similar or the same as the healthy ΔP slope.

Still referring to FIG. 4B, the flow resistance threshold may be determined based on a configuration of the DPF 122. For example, the flow resistance threshold may be selected as a flow resistance value between a known health DPF 122 and a known failed DPF 122. The flow rate interval may be determined based on an engine type. Additionally and/or alternatively, the flow rate interval may be further determined by a ΔP resolution for different flow rates. For example, light duty engines may have a smaller flow rate range, and heavy duty engines may have a wider flow rate range. For example, the flow rate of a certain type engine may be between 0 and 0.8 m³/s, and a flow rate interval may be selected for ΔP between flow rates between 0.3 m³/s and 0.6 m³/s. In another example embodiment, the flow rate interval may be determined based on engine operation. For example, the engine is operating in a range with a medium flow rate, the flow rate interval may be selected to calculate ΔP slope within the operating flow rate range of the engine. In some embodiments, a flow rate threshold is used instead of a flow rate interval. The flow rate threshold may include at least one of a minimum flow rate and a maximum flow rate. The flow rate threshold may be defined by a manufacturer of the engine and/or the aftertreatment system 120, a calibrated value relative to a desired operating parameter of the aftertreatment system 120 and/or a component thereof (e.g., the DPF 122), based on one or more flow rate parameters (e.g., volume flow rate, mass flow rate, a cross sectional shape or size of the aftertreatment system 120), etc. For example, a minimum flow rate may represent a minimum flow rate for optimally operating the DPF 122, and a maximum flow rate may represent a maximum flow rate for optimally operating the DPF 122. In another example embodiment, the flow rate interval (and the minimum flow rate and the maximum flow rate) may be determined based on the availability and/or clarity of sensor data. For example, the sensors 125 may be configured to detect a flow rate and/or a pressure value within a predetermined flow rate interval (e.g., as determined by a sensor manufacturer).

Figure 5A:
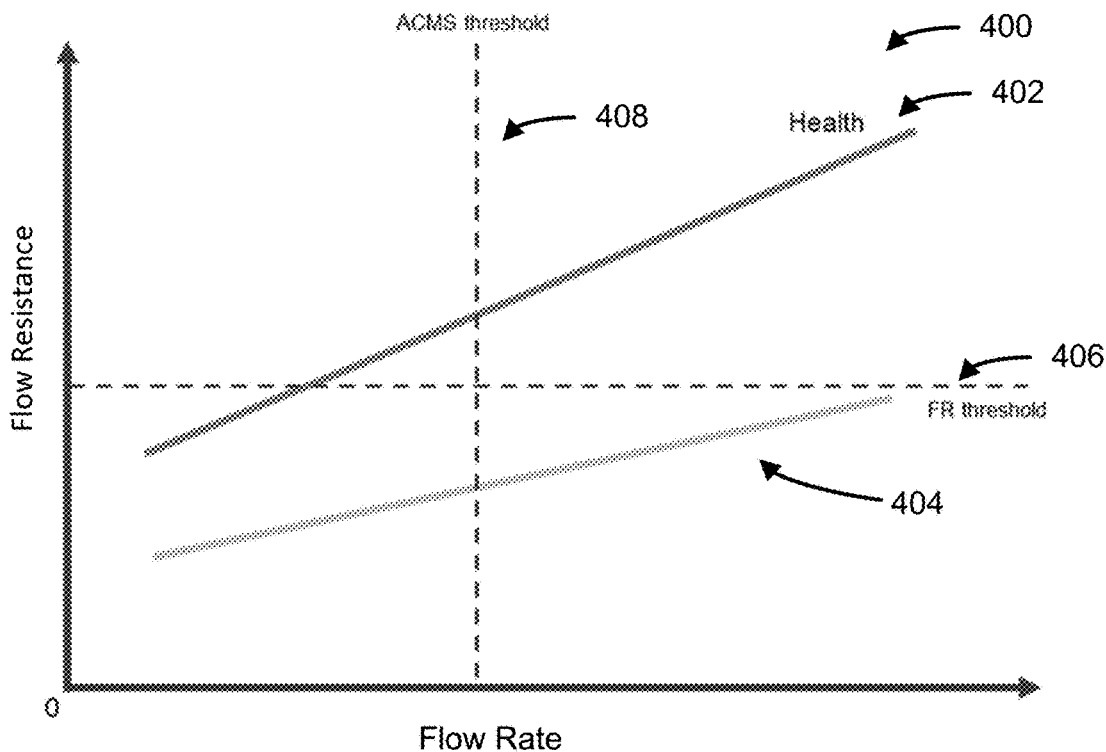
FIGS. 5A and 5B are a graphs illustrating aspects of monitoring an aftertreatment system of the vehicle of FIG. 1, according to an example embodiment.
Figure 5B:
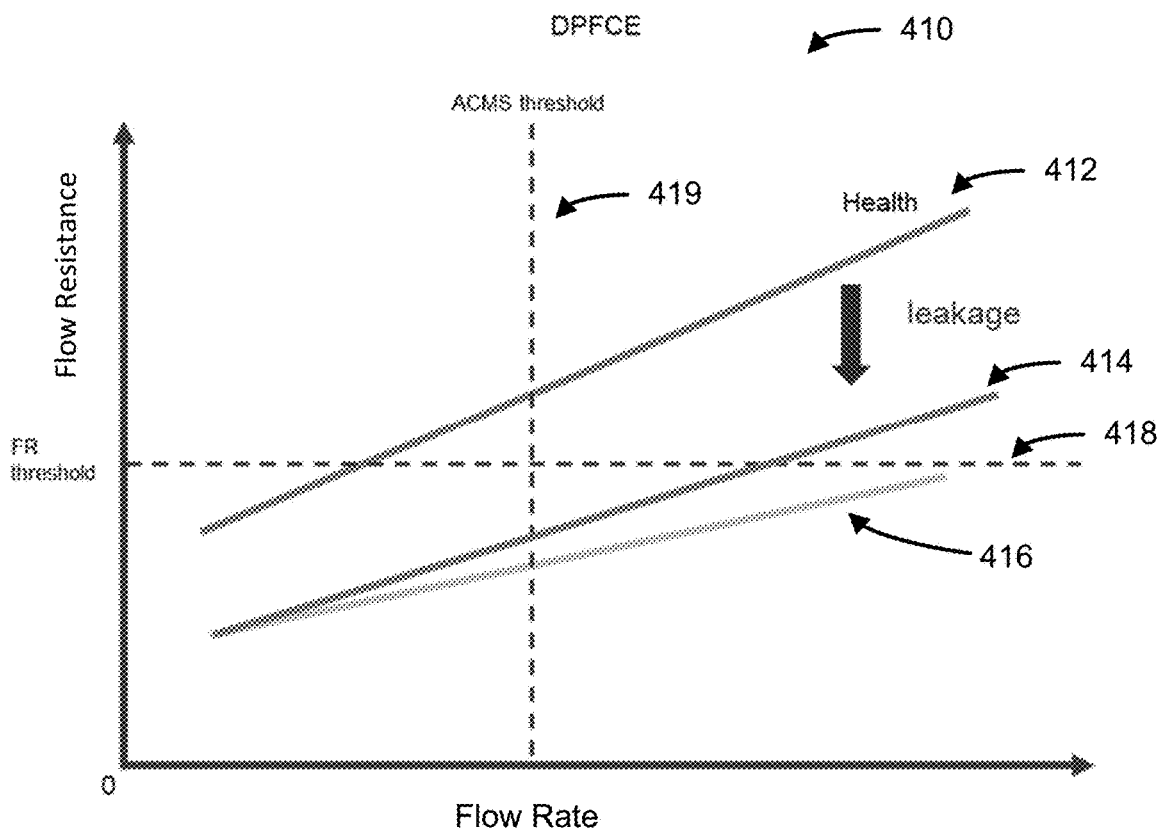

Referring generally to FIGS. 5A and 5B, graphs illustrating aspects of monitoring an aftertreatment system of the vehicle of FIG. 1 are shown, according to example embodiments. Referring first to FIG. 5A, the graph 400 compares flow resistance versus flow rate. As shown in FIG. 5A, the flow resistance may be compared against a flow resistance threshold and a flow rate threshold. For example and as shown in FIG. 5A, a first curve 402 represents the flow resistance versus flow rate for a DPF 122 that has not failed (e.g., a healthy DPF 122). The first curve 402 is substantially above a flow resistance threshold 406 when the curve is greater than the flow rate threshold 408. A second curve 404 represents the flow resistance versus flow rate for a DPF 122 that has failed due to a first failure type. The second curve 304 is substantially below the flow resistance threshold 406 within when the curve is greater than the flow rate threshold 408.

Now referring to FIG. 5B, the graph 400 compares flow resistance versus flow rate, according to an example embodiment. As shown in FIG. 5B, the flow resistance may be compared against a flow resistance threshold and a flow rate threshold. For example and as shown in FIG. 5B, a first curve 412 represents the flow resistance versus flow rate for a DPF 122 that has not failed (e.g., a healthy DPF 122). The first curve 412 is substantially above a flow resistance threshold 418 when the first curve 412 is greater than the flow rate threshold 419. A second curve 414 represents the flow resistance versus flow rate for a DPF 122 that has failed due to a second failure type, shown as a leakage failure type. The second curve 414 is at least partially below the flow resistance threshold 418 within when the second curve 414 is greater than the flow rate threshold 419. Without calculating ΔP slope, the controller 140 may falsely identify the DPF 122 represented by the second curve 414 as failing by the first failure type. Accordingly, as described herein with respect to FIGS. 6D and 7, the controller 140 may determine that a DPF 122 has failed due to the second failure type by comparing the ΔP versus flow rate to determine a ΔP slope to distinguish the second failure type from the first failure type. A third curve 416 represents the flow resistance versus flow rate for a DPF 122 that has failed due to a first failure type. The third curve 416 is substantially below the flow resistance threshold 418 within when the third curve 416 is greater than the flow rate threshold 419. The controller 140 may determine that a DPF 122 has failure due to the first failure type by comparing the flow resistance to the flow resistance threshold 418 when the when the data points is greater than the flow rate threshold 419. The multi-factor diagnostic logic used by the controller 140 to determine a particular failure type is described in more detail herein with respect to FIG. 7.

FIG. 6A is an illustration of a component of the aftertreatment system 120 of the system 100 of FIG. 1 that shows a healthy component, according to an example embodiment. The component shown is a healthy DPF 122A. As shown, the healthy DPF 122A includes a particulate filter media that does not have any or substantially any breaks, tares, damage, etc. between an upstream side (left) and a downstream side (right). FIG. 6B is an illustration of a component of the aftertreatment system 120 of the system 100 of FIG. 1 that shows a failed component, according to an example embodiment. The component shown is a failed DPF 122B. As shown the failed DPF 122B includes a particulate filter media that has a break, tare, or damage between an upstream side (left) and a downstream side (right). FIG. 6C is an illustration of a component of the aftertreatment system of the vehicle of FIG. 1, showing an empty component, according to an example embodiment. The empty component is an empty DPF 122C. The empty DPF 122C does not include any filter media for filtering particulate matter from the exhaust gas that passes therethrough. As shown in FIGS. 6A-6C, ΔP sensors 125 may be positioned at the DPF 122. The ΔP sensors may include a first ΔP positioned upstream of the DPF 122 and a second ΔP sensor positioned downstream of the DPF 122. The ΔP sensors 125 are configured to measure a pressure change (ΔP) across the DPF 122 by measuring a pressure upstream of the DPF 122, measuring a pressure downstream of the DPF 122, and the controller or the sensors themselves calculate or determine a difference in pressure (e.g., ΔP) based on the upstream pressure and the downstream pressure.

FIG. 6D is a graph 420 illustrating aspects of monitoring the aftertreatment system 120 of the system 100 of FIG. 1, according to an example embodiment. The graph 420 depicts a ΔP versus flow rate for a plurality of conditions for the DPF 122. A first curve 422 represents a flow resistance versus flow rate for a healthy DPF 122 (e.g., the DPF 122A of FIG. 6A). A second curve 424 represents a DPF 122 having a first failure type (e.g., the failed DPF 122B of FIG. 6B. The first failure type may be a damaged or broken DPF 122. A third curve 426 represents a DPF 122 having a second failure type that is different from the first failure type. The second failure type may be a leaking DPF 122 that is otherwise healthy. A fourth curve 428 represents an empty DPF 122 (e.g., the empty DPF 122C of FIG. 6C). As shown by the fourth curve 428, the empty DPF 122C does imparts little to no pressure change on the exhaust gas.

Advantageously, the controller 140 is configured to analyze sensor data, determine one or more fluid parameters of the DPF 122, and determine (1) whether the DPF 122 has failed and (2) a type of failure, responsive to determining that the DPF 122 has failed. As briefly described above, the controller 140 may compare a determined flow resistance with a threshold flow resistance to determine if a DPF 122 has failed due to a first failure type. The controller 140 may compare a ΔP slope with a threshold ΔP slope to determine if a DPF 122 has failed due to a second failure type. The multi-factor diagnostic logic used by the controller 140 to determine a particular failure type is described in more detail herein with respect to FIG. 7.

Figure 7:
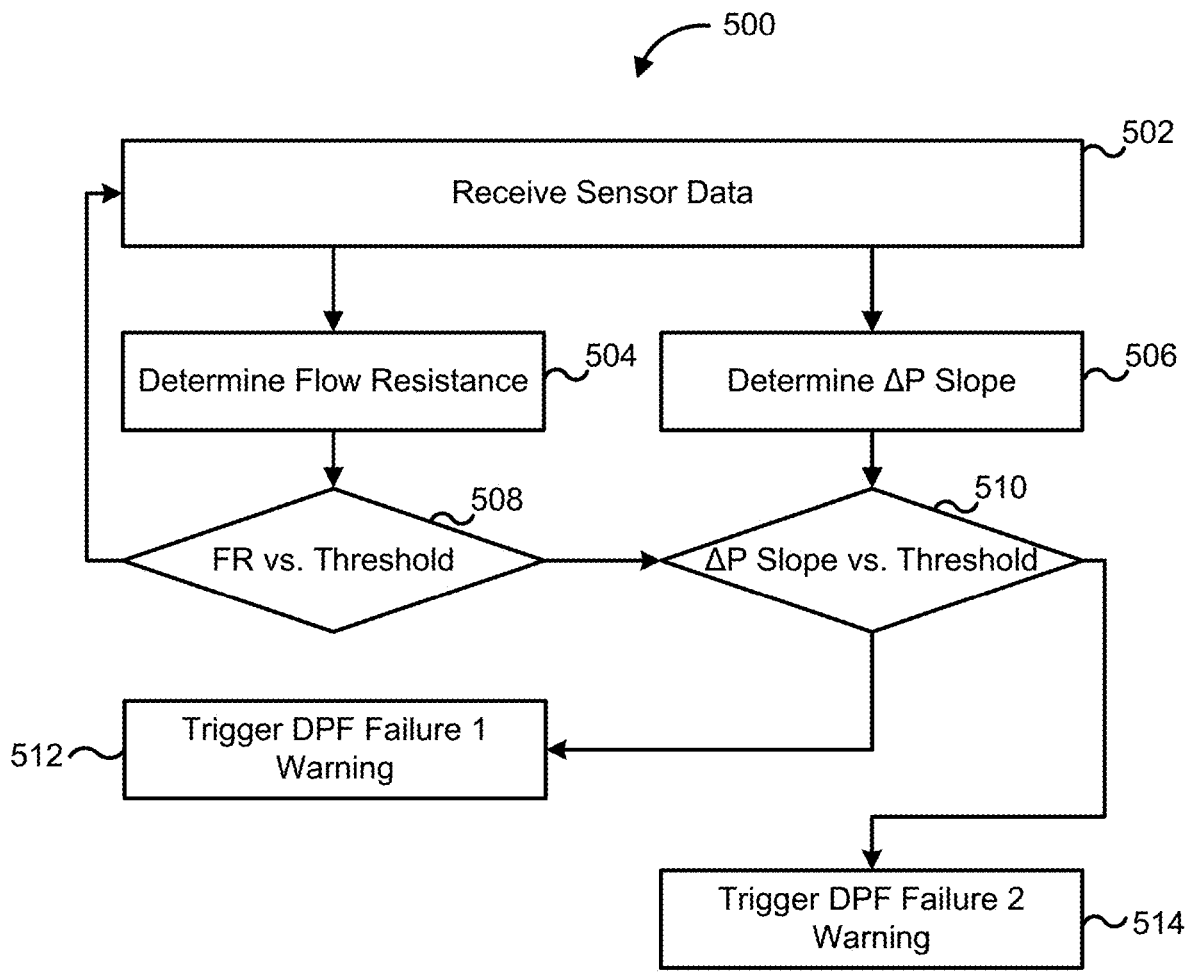
FIG. 7 is a flow diagram of a method of monitoring an aftertreatment system of the vehicle of FIG. 1, according to an example embodiment.

Referring now to FIG. 7, a flow diagram of a method 500 of monitoring the aftertreatment system 120 of the system 100 of FIG. 1 and using multi-factor diagnostics to diagnose one or more components of the aftertreatment system 120 is shown, according to an example embodiment. In some embodiments, the controller 140 and/or one or more components thereof is configured to perform method 500. For example, the controller 140 and/or one or more components thereof, may be structured to perform the method 500, alone or in combination with other devices such as the sensors 125 and/or other components of the system 100. The method 500 may include inputs and/or outputs to/from one or more user devices, such as the operator I/O device 130.

As an overview of method 500, at process 502, the controller 140 receives sensor data from the sensors 125. At process 504, the controller 140 determines a flow resistance, such as a flow resistance through a DPF. At process 506, the controller 140 determines a ΔP slope. At processes 508, the controller 140 compares the flow resistance to a flow resistance threshold. If the flow resistance exceeds the flow resistance threshold, the method 500 continues to process 510. If the flow resistance does not exceed the flow resistance threshold, the method 500 returns to process 502. At process 510, the controller 140 compares the ΔP slope to a ΔP slope threshold. If the flow ΔP slope exceeds the ΔP slope threshold, the method 500 continues to process 512. If the ΔP slope does not exceed the ΔP slope threshold, the method 500 continues to process 514. At process 512, the controller 140 triggers a DPF first failure warning. At process 514, the controller 140 triggers a DPF second failure warning. In some embodiments, the processes of the method 500 may be performed in a different order than as shown in FIG. 7. In some embodiments, the method 500 may include more or fewer processes than as shown in FIG. 7. In some embodiments the processes of the method 500 may be performed concurrently, partially concurrently, or sequentially. Specifically, the processes 504, 508, 512 may be performed concurrently, partially concurrently, or sequentially with the processes 506, 510, and 514.

Referring to the method 500 in more detail, at process 502, the controller 140 receives sensor data from the sensors 125. As briefly described above, the sensor data may include a pressure drop of the exhaust gas across one or more components of the exhaust aftertreatment system, such as the DPF 122. The sensor data may also include a flow rate, such as a volumetric flow rate, a mass flow rate, etc., of the exhaust gas through one or more components of the exhaust aftertreatment system, such as the DPF 122. Further, as described above, the sensor data may include data measured by actual sensors and/or data estimated by virtual sensors.

At process 504, the controller 140 determines a flow resistance. As described above, the controller 140 is configured to analyze the sensor data received at processes 502. Analyzing the sensor data may include determining a flow resistance by calculating a ratio between the pressure change (e.g., ΔP) and the flow rate (e.g., Q).

At process 506, the controller 140 determines a ΔP slope. Analyzing the sensor data may include determining ΔP slope by inputting the sensor data into a statistical model, such as a regression model, to determine an equation for a curve for a graph of ΔP versus Q. The controller 140 may use the equation to determine the ΔP slope.

At processes 508, the controller 140 compares the flow resistance to a flow resistance threshold. The flow resistance may be compared to the flow resistance threshold within a flow rate interval (e.g., above a minimum flow rate and below a maximum flow rate). If the flow resistance is less than the minimum flow resistance threshold, the method 500 continues to process 510. The flow resistance of the DPF 122 lower than a desired amount (e.g., less than the minimum flow resistance threshold) is indicative of a damaged DPF 122 that is allowing more exhaust gas to flow through than desired, reducing the ability of the DPF 122 to separate particulate matter from the exhaust gas. The lower flow resistance, for example, may be indicative of a failed DPF 122 (e.g., the first failure type) or a leaking DPF 122 (e.g., the second damage type). In some embodiments, the flow resistance is below the flow resistance threshold for at least a portion of the flow rate interval (e.g., as shown by curve 414 in FIG. 5B). If the flow resistance does not exceed the flow resistance threshold (e.g., the flow resistance is greater than the minimum flow resistance), the method 500 returns to processes 502.

At process 510, the controller 140 compares the ΔP slope to a ΔP slope threshold. If the flow ΔP slope is less than a minimum ΔP slope threshold (e.g., the ΔP slope is substantially different from the ΔP slope threshold), the method 500 continues to process 512. The minimum ΔP slope threshold is defined as a substantial difference between the determined ΔP slope and a ΔP slope of a healthy DPF 122. For example, a ΔP slope is less than a predefined amount (e.g., less than the minimum ΔP slope threshold), is indicative of a failed DPF 122 (e.g., the first failure type). More specifically, a ΔP slope that is substantially different from a healthy ΔP slope (e.g., different from the health ΔP slope by more than 5%, different by more than 10%, different by more than 15%), is indicative of a failed DPF 122. If the ΔP slope does is not substantially less and/or if the ΔP slope is greater than the ΔP slope threshold, the method 500 continues to processes 514. For example, a ΔP slope within the ΔP slope threshold (e.g., within a predefined amount of a healthy ΔP slope, for example within 5%, within 10%, or within 15% of the health ΔP slope) is indicative of a health DPF 122 that may or may not be leaking. Accordingly, the controller 140 may use the indication that the flow resistance is less than the minimum flow resistance, from process 508, in combination with the ΔP slope threshold comparison, to determine that the DPF 122 is leaking.

At process 512, the controller 140 triggers a DPF first failure warning. The DPF first failure warning may be at least one of an indicator light on the operator I/O device 130, such as an indicator light on a dashboard of a vehicle, a fault code (e.g., provided to a fault code scanner tool and stored in a memory of the controller), a message provided to a device of the operator (e.g., the I/O device 130) or to a remote device, such as a mobile device (e.g., a message to a remote operator via a network). Based on determining that the flow resistance exceeds a flow resistance threshold at process 508 and/or the ΔP slope exceeds a ΔP slope threshold at process 510, the controller 140 determines that the DPF 122 has failed due to a first failure type. The controller 140 is configured to trigger a first warning that the DPF 122 has failed due to the first failure type. As briefly described herein, the first failure type may correspond with broken or damaged filter media of the DPF 122. Triggering the DPF first failure warning may include providing an indication on the operator I/O device 130 that the DPF 122 has failed due to the first failure type.

At process 514, the controller 140 triggers a DPF second failure warning. The DPF second failure warning may be at least one of an indicator light on the operator I/O device 130, such as an indicator light on a dashboard of a vehicle, a fault code (e.g., provided to a fault code scanner tool and stored in a memory of the controller), a message provided to a device of the operator (e.g., the I/O device 130) or to a remote device, such as a mobile device (e.g., a message to a remote operator via a network). Based on determining that the flow resistance exceeds a flow resistance threshold at process 508 and the ΔP slope does not exceed a ΔP slope threshold at process 510, the controller 140 determines that the DPF 122 has failed due to a second failure type. The controller 140 is configured to trigger a second warning that the DPF 122 has failed due to the first failure type. As briefly described herein, the second failure type may correspond with a leaking DPF 122. Triggering the DPF second failure warning may include providing an indication on the operator I/O device 130 that the DPF 122 has failed due to the second failure type.

In some embodiments, one or more of the processes of the method 500 may be omitted. For example, the controller 140 may determine that the DPF 122 has failed due to the first failure condition based on determining a ΔP slope and comparing the ΔP slope to a ΔP slope threshold, as described in processes 506, 510, and 512.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the activities and functionalities of the sensor management circuit 210 and/or the aftertreatment management circuit 212 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A system, comprising:
    an aftertreatment system in exhaust gas receiving communication with an engine, the aftertreatment system comprising a diesel particulate filter (DPF);
    at least one sensor coupled to the DPF; and
    a controller configured to:
        receive sensor data from the at least one sensor, the sensor data comprising a pressure change and a flow rate;
        determine, based on the sensor data, a flow resistance of the DPF and a pressure change value;
        determine that the flow resistance is less than a flow resistance threshold;
        determine whether the pressure change value is less than a pressure change value threshold responsive to determining that the flow resistance is less than the flow resistance threshold;
        trigger a first failure warning based on determining that the flow resistance is less than the flow resistance threshold and that the pressure change value is less than the pressure change value threshold, wherein triggering the first failure warning comprises providing a first notification via an operator input/output device; and
        trigger a second failure warning based on determining that that the flow resistance is less than the flow resistance threshold and that the pressure change value is greater than the pressure change value threshold, wherein triggering the second failure warning comprises providing a second notification via the operator input/output device.

2. The system of claim 1, wherein determining the pressure change value comprises:
    inputting the sensor data into a regression model;
    determining a regression equation based on an output of the regression model; and
    determining a slope of the regression equation, the slope of the regression equation corresponding to the pressure change value.

3. The system of claim 2, wherein the pressure change value is a pressure change slope.

4. The system of claim 1, wherein the flow resistance is compared to the flow resistance threshold within a flow rate interval, the flow rate interval bounded by a minimum flow rate and a maximum flow rate.

5. The system of claim 1, wherein the pressure change value is compared to the pressure change value threshold within a flow rate interval, the flow rate interval bounded by a minimum flow rate and a maximum flow rate.

6. The system of claim 1, wherein the first failure warning is indicative of a first failure type, the first failure type corresponding to a damaged DPF.

7. The system of claim 1, wherein the second failure warning is indicative of a second failure type, the second failure type corresponding to a leaking DPF.

8. A method of diagnosing an aftertreatment system component comprising:
receiving sensor data from at least one sensor, the sensor data comprising a pressure change and a flow rate associated with a diesel particulate filter (DPF);
determining, based on the sensor data, a flow resistance of the DPF and a pressure change value;
determining that the flow resistance is less than a flow resistance threshold;
determining whether the pressure change value is less than a pressure change value threshold responsive to determining that the flow resistance is less than the flow resistance threshold;
triggering a first failure warning based on determining that the flow resistance is less than the flow resistance threshold and that the pressure change value is less than the pressure change value threshold, wherein triggering the first failure warning comprises providing a first notification via an operator input/output device; and
triggering a second failure warning based on determining that that the flow resistance is less than the flow resistance threshold and that the pressure change value is greater than the pressure change value threshold, wherein triggering the second failure warning comprises providing a second notification via the operator input/output device.

9. The method of claim 8, wherein determining the pressure change value comprises:
inputting the sensor data into a regression model;
determining a regression equation based on an output of the regression model; and
determining a slope of the regression equation, the slope of the regression equation corresponding to the pressure change value.

10. The method of claim 9, wherein the pressure change value is a pressure change slope.

11. The method of claim 8, wherein the flow resistance is compared to the flow resistance threshold within a flow rate interval, the flow rate interval bounded by a minimum flow rate and a maximum flow rate.

12. The method of claim 8, wherein the pressure change value is compared to the pressure change value threshold within a flow rate interval, the flow rate interval bounded by a minimum flow rate and a maximum flow rate.

13. The method of claim 8, wherein the first failure warning is indicative of a first failure type, the first failure type corresponding to a damaged DPF.

14. The method of claim 8, wherein the second failure warning is indicative of a second failure type, the second failure type corresponding to a leaking DPF.

15. An apparatus for diagnosing an aftertreatment system component of a vehicle, the apparatus comprising:
one or more processors; and
memory storing instructions that, when executed by the one or more processors, cause the one or more processors to:
receive sensor data from at least one sensor, the sensor data comprising a pressure change and a flow rate associated with a diesel particulate filter (DPF);
determine, based on the sensor data, a flow resistance of the DPF and a pressure change value;
determine that the flow resistance is less than a flow resistance threshold;
determine whether the pressure change value is less than a pressure change value threshold responsive to determining that the flow resistance is less than the flow resistance threshold;
trigger a first failure warning based on determining that the flow resistance is less than the flow resistance threshold and that the pressure change value is less than the pressure change value threshold, wherein triggering the first failure warning comprises providing a first notification via an operator input/output device; and
trigger a second failure warning based on determining that the flow resistance is less than the flow resistance threshold and that the pressure change value is greater than the pressure change value threshold, wherein triggering the second failure warning comprises providing a second notification via the operator input/output device.

16. The apparatus of claim 15, wherein determining the pressure change value comprises:
inputting the sensor data into a regression model;
determining a regression equation based on an output of the regression model; and
determining a slope of the regression equation, the slope of the regression equation corresponding to the pressure change value;
wherein the pressure change value is a pressure change slope.

17. The apparatus of claim 15, wherein the flow resistance is compared to the flow resistance threshold within a flow rate interval, the flow rate interval bounded by a minimum flow rate and a maximum flow rate.

18. The apparatus of claim 15, wherein the pressure change value is compared to the pressure change value threshold within a flow rate interval, the flow rate interval bounded by a minimum flow rate and a maximum flow rate.

19. The apparatus of claim 15, wherein the first failure warning is indicative of a first failure type, the first failure type corresponding to a damaged DPF.

20. The apparatus of claim 15, wherein the second failure warning is indicative of a second failure type, the second failure type corresponding to a leaking DPF.

* * * * *